(12) United States Patent
Grossman et al.

(10) Patent No.: US 10,620,610 B2
(45) Date of Patent: Apr. 14, 2020

(54) TECHNIQUES FOR GENERATING MOTION SCULPTURE MODELS FOR THREE-DIMENSIONAL PRINTING

(71) Applicant: AUTODESK, Inc, San Rafael, CA (US)

(72) Inventors: Tovi Grossman, Toronto (CA); Ryan Michael Schmidt, Toronto (CA); Rubaiat Habib, Toronto (CA); Cory Mogk, Mississauga (CA); George Fitzmaurice, Toronto (CA)

(73) Assignee: Autodesk, Inc., San Rafael, CA (US)

( * ) Notice: Subject to any disclaimer, the term of this patent is extended or adjusted under 35 U.S.C. 154(b) by 528 days.

(21) Appl. No.: 14/811,746

(22) Filed: Jul. 28, 2015

(65) Prior Publication Data

US 2017/0028643 A1    Feb. 2, 2017

(51) Int. Cl.
*B29C 67/00* (2017.01)
*G05B 19/4099* (2006.01)
(Continued)

(52) U.S. Cl.
CPC ........ *G05B 19/4099* (2013.01); *B29C 64/386* (2017.08); *B33Y 50/02* (2014.12); *G05B 2219/49023* (2013.01)

(58) Field of Classification Search
CPC . B29C 67/0088; B33Y 50/02; G05B 19/4099; G05B 2219/35134; G05B 2219/49007
See application file for complete search history.

(56) References Cited

U.S. PATENT DOCUMENTS

| | | | |
|---|---|---|---|
| 4,348,618 A * | 9/1982 | Nakamura | B60L 15/005 104/290 |
| 5,593,447 A * | 1/1997 | Angeli | A61F 2/32 623/22.11 |

(Continued)

OTHER PUBLICATIONS

Autodesk. Maya. tinyurl.com/Adsk-maya.
(Continued)

*Primary Examiner* — Kenneth M Lo
*Assistant Examiner* — Mohammad A Rahman
(74) *Attorney, Agent, or Firm* — Artegis Law Group, LLP

(57) ABSTRACT

In one embodiment of the present invention, a motion effect generator enables the creation of tangible representations of the motion of three-dimensional (3D) animated models for 3D printing. In operation, the motion effect generator receives a 3D animated model and animates the model through a configurable interval of time. As the motion effect generator animates the model, the motion effect generator applies a motion depiction technique to one or more selected components included in the model—explicitly portraying the motion of the 3D animated model as static motion effect geometries. Subsequently, based on the motion effect geometries, the motion effect generator creates a 3D motion sculpture model that is amenable to 3D printing. By automating the design of motion sculpture models, the motion effect generator reduces the time, sculpting expertise, and familiarity with 3D printer fabrication constraints typically required to create motion sculpture models using conventional, primarily manual design techniques.

20 Claims, 5 Drawing Sheets

(51) Int. Cl.
B29C 64/386 (2017.01)
B33Y 50/02 (2015.01)

(56) References Cited

U.S. PATENT DOCUMENTS

| | | | | |
|---|---|---|---|---|
| 8,005,145 B2* | 8/2011 | Lainema | ............... | H04N 19/52 375/240.16 |
| 8,144,153 B1* | 3/2012 | Sullivan | ................. | G06T 13/40 345/419 |
| 8,935,474 B1* | 1/2015 | Todd | ...................... | G06F 12/08 711/117 |
| 9,071,611 B2* | 6/2015 | Yadav | ................ | H04L 63/0227 |
| 2004/0160640 A1* | 8/2004 | Corrales | ................ | G03B 35/00 358/1.18 |
| 2006/0115971 A1* | 6/2006 | Bau | ....................... | B01L 3/0275 438/591 |
| 2008/0072166 A1* | 3/2008 | Reddy | .................... | G06T 13/00 715/764 |
| 2008/0079718 A1* | 4/2008 | Woo | ........................ | G06T 13/20 345/419 |
| 2008/0110992 A1* | 5/2008 | Knowles | ................. | A47F 9/046 235/462.14 |
| 2008/0246757 A1* | 10/2008 | Ito | ........................... | G06T 15/10 345/419 |
| 2012/0105869 A1* | 5/2012 | Golan | ................ | G01B 11/2513 356/610 |
| 2015/0019991 A1* | 1/2015 | Kristjánsson | ....... | H04L 41/0853 715/747 |
| 2015/0178972 A1* | 6/2015 | Barcay | .................... | G06T 13/20 345/419 |
| 2015/0187130 A1* | 7/2015 | Guskov | .................. | G06T 17/20 345/420 |
| 2015/0205553 A1* | 7/2015 | Kobayashi | ........... | G06F 3/1256 358/1.15 |
| 2015/0287247 A1* | 10/2015 | Willis | ..................... | G06T 19/20 345/419 |
| 2015/0294492 A1* | 10/2015 | Koch | .................... | G06T 15/205 345/426 |
| 2015/0352790 A1* | 12/2015 | Hadas | ................... | B29C 64/386 700/119 |
| 2016/0274830 A1* | 9/2016 | Jang | ...................... | G06F 3/1208 |
| 2018/0157965 A1* | 6/2018 | Sun | ...................... | G06N 3/0454 |

OTHER PUBLICATIONS

Autodesk. Meshmixer. http://meshmixer.com.
Baudisch, P., Tan, D., Collomb, M., Robbins, D., Hinckley, K., Agrawala, M., & Ramos, G. (2006). "Phosphor: explaining transitions in the user interface using afterglow effects". ACM UIST (pp. 169-178).
QT, a C++ cross platform application and UI framework. http://qt-project.org/.
Ceylan, D., Li, W., Mitra, N. J., Agrawala, M., & Pauly, M. (2013). "Designing and fabricating mechanical automata from mocap sequences". ACM Trans. Graph, 32(6), 186.
Coros, S., Thomaszewski, B., Noris, G., Sueda, S., Forberg, M., Sumner, R. W., et al. (2013). "Computational design of mechanical characters". ACM Trans on Graph (TOG), 32(4), 83.
Cutting, J. E. (2002). "Representing motion in a static image: constraints and parallels in art, science, and popular culture". Perception-London, 31(10), 1165-1194.
Dragicevic, P., and Jansen, Y. "List of physical visualizations". tinyurl.com/physvis, 2013.
Haller M., Hanl, C., & Diephuis, J. (2004). "Nonphotorealistic rendering techniques for motion in computer games". CIE, 2(4), 11-11.
Jansen, Y., Dragicevic, P., & Fekete, J. D. (Apr. 2013). "Evaluating the efficiency of physical visualizations". ACM CHI (pp. 2593-2602).
Lake, A., Marshall, C., Harris, M., & Blackstein, M. (Jun. 2000). "Stylized rendering techniques for scalable real-time 3D animation". ACM NPAR .13-20.
Marinetti, F. T. (1909). "The founding and manifesto of Futurism". Marinetti: Selected writings, 1-4.
Masuch, M., Schlechtweg, S., & Schulz, R. (Jul. 1999). "Speedlines: depicting motion in motionless pictures". ACM SIGGRAPH (p. 277).
McCloud, S. (1993). "Understanding comics: The invisible art". Northampton, Mass.
Mori, Y., & Igarashi, T. (Aug. 2007). "Plushie: an interactive design system for plush toys". ACM Trans. Graph (TOG) (vol. 26, No. 3, p. 45).
Mueller, S., Lopes, P., & Baudisch, P. (Oct. 2012). "Interactive construction: interactive fabrication of functional mechanical devices". ACM UIST. 599-606.
Nienhaus, M., & Dollner, J. (2005). "Depicting dynamics using principles of visual art and narrations". Computer Graphics and Applications, IEEE, 25(3), 40-51.
Prévost R., Whiting, E., Lefebvre, S., & SorkineHornung, O. (2013). "Make it stand: balancing shapes for 3d fabrication". ACM Trans. Graph, 32(4), 81.
Ramachandran, V. S., & Anstis, S. M. (1986). "The perception of apparent motion". Scientific American, 254(6), 102-109.
Zhu L., Xu, W., Snyder, J., Liu, Y., Wang, G., & Guo, B. (2012). "Motion-guided mechanical toy modeling". ACM Trans. Graph., 31(6), 127.
Savage, V., Chang, C., & Hartmann, B. (Oct. 2013). "Sauron: embedded single-camera sensing of printed physical user interfaces". ACM UIST (pp. 447-456).
Savage, V., Schmidth, R., Grossman, T., Fitzmaurice, G., & Hartmann, B. (2014). "A Series of Tubes: Adding Interactivity to 3D Prints Using Internal Pipes". ACM UIST.
Schmid, J., Sumner, R. W., Bowles, H., & Gross, M. (2010). "Programmable motion effects". ACM SIGGRAPH. (pp. 1-9).
Wills, K., Brockmeyer, E., Hudson, S., & Poupyrev, I. (Oct. 2012). "Printed optics: 3d printing of embedded optical elements for interactive devices". ACM UIST (pp. 589-598).
Skouras, M., Thomaszewski, B., Coros, S., Bickel, B., & Gross, M. (2013). "Computational design of actuated deformable characters". ACM Trans. Graph, 32(4), 82.
Thomaszewski, B., Coros, S., Gauge, D., Megaro, V., Grinspun, E., & Gross, M. (2014). "Computational design of linkage-based characters". ACM Trans. Graph (TOG), 33(4), 64.
Swaminathan, S., Shi, C., Jansen, Y., Dragicevic, P., Oehlberg, L. A., & Fekete, J. A., (Apr. 2014). "Supporting the design and fabrication of physical visualizations". ACM CHI (pp. 3845-3854).
Teramoto, O., Park, I. K., & Igarashi, T. (2010). "Interactive motion photography from a single image". The Visual Computer, 26(11), 1339-1348.

* cited by examiner

TECHNIQUES FOR GENERATING MOTION SCULPTURE MODELS FOR THREE-DIMENSIONAL PRINTING

BACKGROUND OF THE INVENTION

Field of the Invention

Embodiments of the present invention relate generally to computer processing and, more specifically, to techniques for generating motion sculpture models for three-dimensional printing.

Description of the Related Art

Democratized digital manufacturing devices, such as desktop three-dimensional (3D) printers, enable a wide range of both non-professional and professional users to create physical objects based on 3D printable digital models. Notably, some artists and scientists leverage 3D printers to create 3D motion sculptures—tangible representations of 3D animated models that include static visual artifacts to represent an object's motion. In general, the user creates a 3D digital model for the 3D motion sculpture and then configures the 3D printer to fabricate the 3D motion sculpture based on the model. For example, an artist could create a 3D digital model of a "smoke trail" bracelet and then configure a 3D printer to fabricate the bracelet based on the model.

As part of developing 3D digital models for motion sculptures, users typically employ one or more motion depiction techniques. For instance, one common motion depiction technique implements "multiple stroboscopic stamps" to represent complex motion occurring within a very short period of time, such as human movements or the flapping wings of a flying bird. When implementing multiple stroboscopic stamps, a user typically records a series of discrete, static, and slightly different 3D digital "stamps" of a moving 3D object taken at different times. The user then overlaps the stamps into a single 3D digital model that conveys the impression of motion without sacrificing the clarity of the moving 3D object. Once complete, the user configures a 3D printer to fabricate a motion sculpture based on the single 3D digital model.

While motion sculptures may effectively depict motion, designing the associated 3D digital model is typically a time-consuming and tedious process. Although existing design tools may be used during certain portions of the design process, such as overlapping different stamps into a 3D digital model, crafting a 3D digital model of multiple motion sculptures is primarily a slow, manual process. Further, creating a 3D digital model that, when fabricated via a 3D printer, produces a high-quality 3D printed motion sculpture usually requires significant sculpting expertise and familiarity with the particular 3D printer and the fabrication constraints associated with the 3D printer.

As the foregoing illustrates, what is needed in the art are more effective techniques for generating 3D models of motion sculptures for 3D printing.

SUMMARY OF THE INVENTION

One embodiment of the present invention sets forth a computer-implemented method for generating a three-dimensional (3D) model of a motion sculpture for 3D printing. The method includes applying a first motion depiction technique to a selected component included in a 3D animated model to generate a 3D motion effect geometry, and converting the 3D motion effect geometry to a 3D digital model.

One advantage of the disclosed approach is that automating motion sculpture model design significantly improves user productivity compared to conventional, primarily manual approaches to motion sculpture model design. Further, because the disclosed techniques incorporate "expert" knowledge regarding sculpting and fabrication constraints associated with 3D printers, relatively unskilled users may leverage these techniques to generate models that configure 3D printers to produce high-quality motion sculptures.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
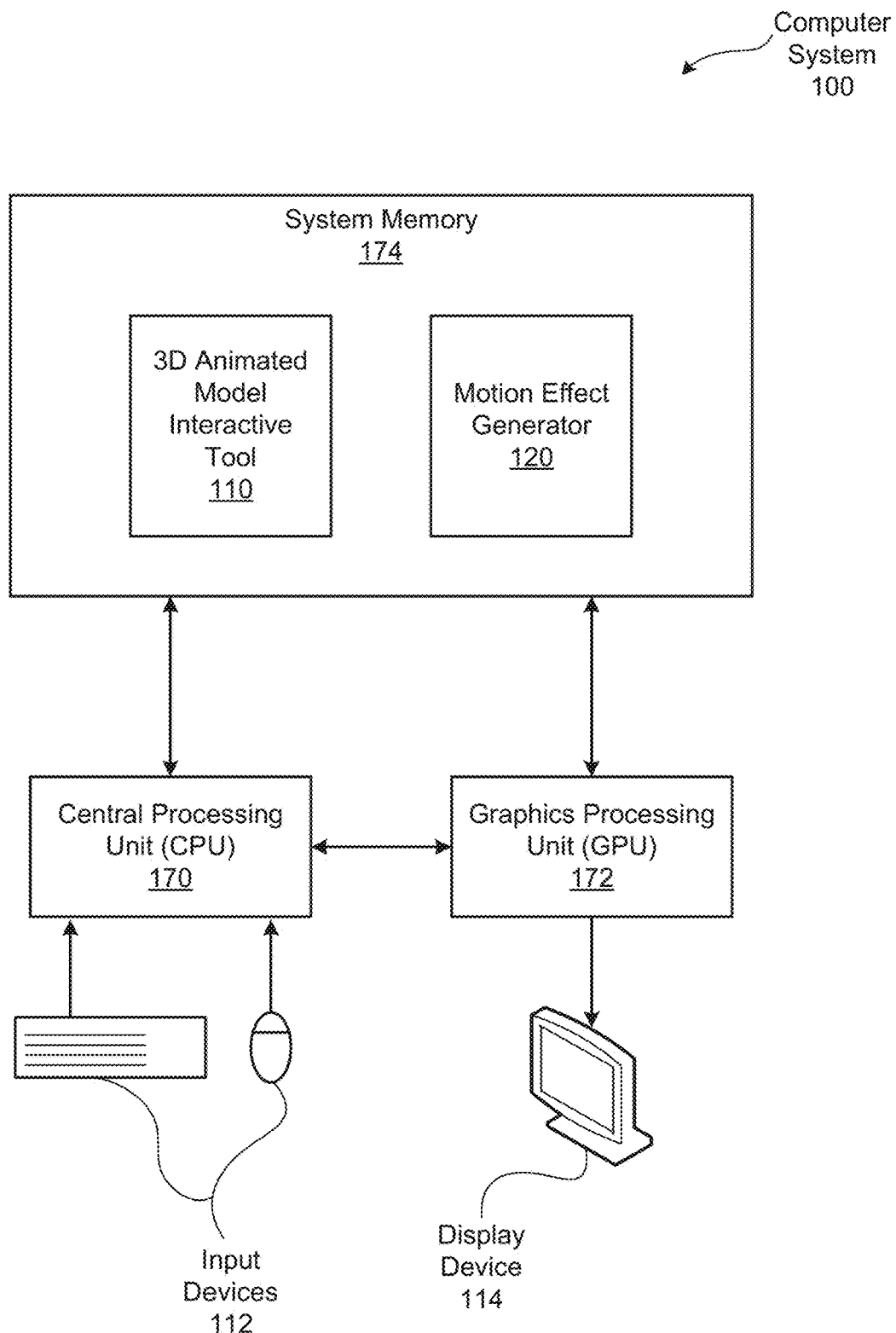
FIG. 1 illustrates a computer system configured to implement one or more aspects of the present invention.

FIG. 1 illustrates a computer system 100 configured to implement one or more aspects of the present invention. As shown, the computer system 100 includes, without limitation, a central processing unit (CPU) 170, input devices 112, a graphics processing unit (GPU) 172, a display device 114, and a system memory 174, The CPU 170 receives input user input information from the input devices 112, such as a keyboard or a mouse. In operation, the CPU 170 is the master processor of the computer system 100, controlling and coordinating operations of other system components. In particular, the CPU 170 issues commands that control the operation of the GPU 172. The GPU 172 incorporates circuitry optimized for graphics and video processing, including, for example, video output circuitry. The GPU 172 delivers pixels to the display device 114 that may be any conventional cathode ray tube, liquid crystal display, light-emitting diode display, or the like. In various embodiments, GPU 172 may be integrated with one or more of other elements of FIG. 1 to form a single system. For example, the GPU 172 may be integrated with the CPU 170 and other connection circuitry on a single chip to form a system on chip (SoC).

The system memory 174 stores content, such as software applications and data, for use by the CPU 170 and the GPU 172. As shown, the system memory 174 includes, without limitation, a 3D animated model interactive tool 120, and a motion effect generator 120. The 3D animated model interactive tool 110 and the motion effect generator 120 are software applications that execute on the CPU 170, the GPU 172, or any combination of the CPU 170 and the GPU 172.

The 3D animated model interactive tool 110 enables, without limitation, specification of a 3D model, animation of the 3D model, and modification of the 3D model animated model. For explanatory purposes "3D model animated model" as used herein refers to the 3D model and any motion data associated with the 3D model, including none (i.e., the 3D model before animation). The 3D animated model interactive tool 110 may be implemented in any technically feasible fashion.

For instance, and without limitation, to enable specification of the 3D model, 3D animated model interactive tool 110 may include computer aided design (CAD) software. Such CAD software often includes a graphical user interface that converts designer input such as symbols and brush stroke operations to geometries in the 3D model. Alternatively the 3D animated model iterative tool 110 may be configured to receive input from a 3D scanner that analyzes an existing 3D solid object to create the 3D model as a digital template for creation of copies of the existing 3D solid object. In yet other embodiments, the 3D model is created manually and transmitted to the 3D animated model interactive tool 110.

The 3D animated model interactive tool 110 may include any number and type of tools for animating 3D models and simulating the 3D animated model. For example, and without limitation, the 3D animated model interactive tool 110 may include a 3D character animation tool that enables the user to pose and move 3D models of human bodies using full body inverse kinematics (FBIK). In FBIK, the user translates and rotates individual body parts, and the 3D character animation tool "solves" each frame—ensuring that the character's full body follows the user's direction.

The 3D animated model interactive tool 110 is configured to receive user input information from the input devices 112. After the 3D animated model interactive tool 110 processes the user input information in conjunction with the 3D animated model, the 3D animated model interactive tool 110 delivers pixels to the display device 114. The 3D animated model interactive tool 110 is configured to continuously repeat this cycle, enabling the user to dynamically interact with the 3D animated model based on corresponding images on the display device 114.

Although viewing the motion of the 3D animated model via the display device 114 may suffice for many applications, other applications (e.g., creating motion-based art sculptures, studying the deformation of a flying bird over time, etc.) may benefit from portraying and/or studying the 3D animated model from all angles. For this reason, the motion effect generator 120 is coupled to the 3D animated model iterative tool 110 and is configured to enable the user to capture the motion of the 3D animated model as a motion sculpture model that may be fabricated using a 3D printer. More specifically, the motion effect generator 120 enables the user to interactively craft a motion sculpture model based on the 3D animated model—explicitly visualizing the motions of the 3D animated model in static geometries that are amenable to fabrication using a 3D printer.

In general, the 3D animated model iterative tool 110 and the motion effect generator 120 implement a variety of 3D modelling techniques (e.g., animation, simulation, depiction, etc.) that enable effective physical visualization of the motion of 3D animated models. Accordingly, the 3D animated model iterative tool 110 and the motion effect generator 120 exemplify 3D sculpting/modeling as a non-static (dynamic) art. Notably, in alternate embodiment, the inventive concepts described herein may be applied to design processes that do not include fabrication using a 3D printer. For example, in some embodiments, the functionality included in the 3D animated model iterative tool 110 and the motion effect generator 120 may be leveraged to facilitate architectural design, conceptual jewelry design, and so forth.

In alternate embodiments, the system memory 174 may not include the 3D animated model interactive tool 110 and/or the motion effect generator 120. In other embodiments, the 3D animated model interactive tool 110 and/or the motion effect generator 120 are integrated into any number (including one) of software applications. In some embodiments, the 3D animated model interactive tool 110 and/or the motion effect generator 120 may be provided as an application program (or programs) stored on computer readable media such as a CD-ROM, DVD-ROM, flash memory module, or other tangible storage media.

The components illustrated in the computer system 100 may be included in any type of computer system 100, e.g., desktop computers, server computers, laptop computers, tablet computers, and the like. Additionally, software applications illustrated in computer system 100 may execute on distributed systems communicating over computer networks including local area networks or large, wide area networks, such as the Internet. Notably, the 3D animated model interactive tool 110 and the motion effect generator 120 described herein are not limited to any particular computing system and may be adapted to take advantage of new computing systems as they become available.

It will be appreciated that the computer system 100 shown herein is illustrative and that variations and modifications are possible. The number of CPUs 170, the number of GPUs 172, the number of system memories 174, and the number of applications included in the system memory 174 may be modified as desired. Further, the connection topology between the various units in FIG. 1 may be modified as desired. In some embodiments, any combination of the CPU 170, the GPU 172, and the system memory 174 may be replaced with any type of distributed computer system or cloud computing environment, such as a public or a hybird cloud.

Generating Motion Sculptures

Figure 2:
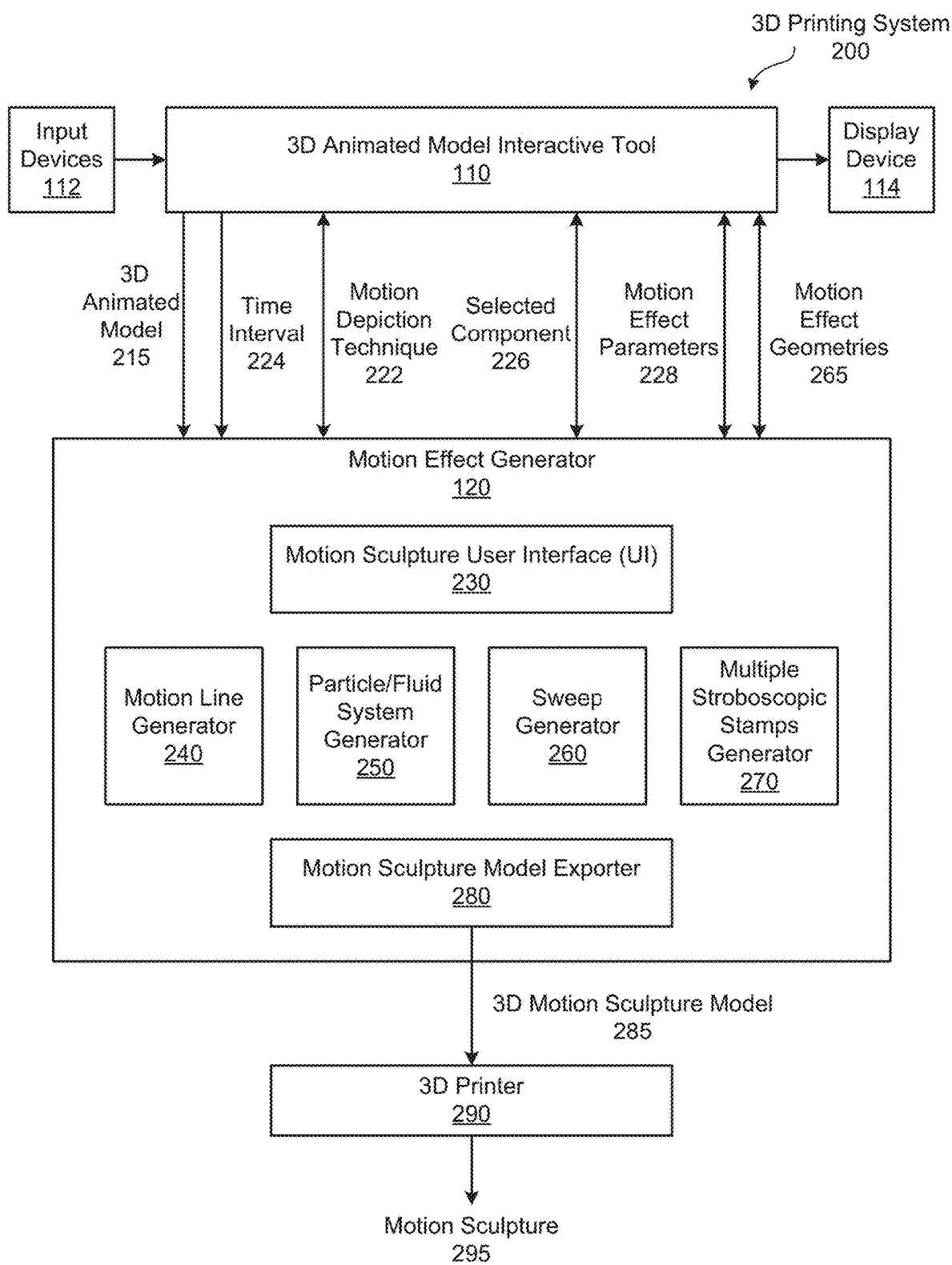
FIG. 2 illustrates a three-dimensional (3D) printing system within which the computer system of FIG. 1 may be implemented, according to one embodiment of the present invention.

FIG. 2 illustrates a three-dimensional (3D) printing system 200 within which the computer system 100 of FIG. 1 may be implemented, according to one embodiment of the present invention. As shown, the 3D printing system 200 includes, without limitation, the input devices 112, the 3D animated model interactive tool 110, the display device 114, the motion effect generator 120, and a 3D printer 290. As shown in FIG. 1, the 3D animated model interactive tool 110 and the motion effect generator 120 are included in the system memory 174 of the computer system 100 and execute on the CPU 170 and/or the GPU 172.

In operation, the 3D animated model interactive tool 110 enables specification of a 3D animated model 215. The 3D animated model 215 includes both a 3D model that describes a 3D solid object and animation information, such as the movement of the 3D model over a time interval. The 3D animated model interactive tool 110 receives user input via the input devices 112 and delivers pixels that depict the 3D animated model 215 to the display device 114, enabling the user to interact with the 3D animated model 215 on a real-time basis.

To capture the motion of the 3D animated model 215 in a static fashion that is amenable to fabrication using the 3D printer 290, the 3D animated model interactive tool 110 transmits the 3D animated model 215 to the motion effect generator 120. As shown, the motion effect generator 120 includes, without limitation, a motion sculpture user interface (UI) 230, a motion line generator 240, a particle/fluid system generator 250, a sweep generator 260, a multiple stroboscopic stamps generator 270, and a motion sculpture model exporter 280.

Upon receiving the 3D animated model 215, the motion effect generator 120 causes the display device 114 to display the motion sculpture UI 230. Together, the motion sculpture UI 230 and a UI included in the 3D animated model interactive tool 110 (not shown in FIG. 2) enable the user to interactively construct a 3D motion sculpture model 285 based on the 3D animated model 215. In general, the motion sculpture UI 230 provides a variety of mechanisms (e.g., UI widgets, panels, tabs, etc.) that allow the user to select, configure, and apply motion depiction techniques 222 to the 3D animated model 215 to create motion effect geometries 265.

In addition to the motion depiction technique 222, the motion sculpture UI 230 and the UI included in the 3D animated model interactive tool 110 enable the user to specify, without limitation, a time interval 224, a selected component 226, and motion effect parameters 228. In a complimentary fashion, the motion effect generator 120 generates motion effect geometries 265 based on the motion depiction technique 222, the time interval 224, the selected component 226, and the motion effect parameters 228. More specifically, the motion effect generator 120 applies the motion depiction technique 222 based the location of the selected component 226 included in the 3D animated model 215 as the 3D animated model 215 animates through the time interval 224. During the animation, the motion effect generator 120 configures the motion effect geometries 265 (the result of applying the motion depiction technique 222) to reflect the motion effect parameters 228 and causes the display 114 to display the motion effect geometries 265.

Notably, to optimize the design experience, the motion effect generator 120 configures the motion sculpture UI 230 to present selection mechanisms that are tailored to the currently selected motion depiction technique 222. More specifically, the motion effect generator 120 encourages the user to enter relevant information via intuitive, user-friendly, entry mechanisms (e.g., UI widgets). The motion effect generator 120 is configured to implement, without limitation, four motion depiction techniques 222: motion line, particle/fluid system, sweep, and multiple stroboscopic stamps. In alternate embodiments, the motion effect generator 120 may implement any number and type of motion depiction techniques 222 in any technically feasible fashion.

If the motion depiction technique 222 is "motion line," then the motion line generator 240 processes the user input and generates motion effect geometries 265 that represent motion lines, also known as speed lines. Among other things, motion lines are used in cartoons, comics and scientific illustrations to represent the path of a moving object. In conventional approaches to incorporating motion lines into sculptures, users typically sculpt 3D geometry along the trajectory of the motion line.

To generate motion effect geometries 265 corresponding to motion lines, the motion line generator 240 samples numerous instances of the selected component 226 included in the 3D animated model 215 over the time interval 224 to compute the trajectory of the selected component 226. Notably, the motion line generator 240 creates motion effect geometries 265 along a physical length that correlates to the temporal length of the time interval 224. Because motion lines typically emanate from a point, the motion line generator 240 configures the motion sculpture UI 230 to present a vertex selection mode to facilitate the specification of one or more vertices on the surface of the 3D animated model 215 as the selected component 226. Further, the motion line generator 240 configures the motion sculpture UI 230 to enable the motion effect parameters 228 that are applicable to motion lines.

For example, and without limitation, in some embodiments, the motion line generator 240 configures the motion sculpture UI 230 to present a "radius" parameter UI widget that controls the width of the motion line included in the motion effect geometry 265. In some embodiments, and without limitation, the motion line generator 240 presents a "style" parameter that controls the shape of the motion effect geometry 265. The style parameter may be set to, without limitation, cylinder, tapered, turbulent, streak or rugged. If the value of the style parameter is "cylinder," then the motion line generator 240 creates smooth volumetric curves along the trajectory of the selected component 226. If the value of the style parameter is "tapered," then the motion line generator 240 creates a motion line that becomes thinner as time progresses. If the value of the style parameter is "turbulent," then the motion line generator 240 adds noise to the motion line. In a similar fashion, the "streak" and "rugged" settings direct the motion line generator 240 to stylistically vary the motion effect geometry 265 to produce desired visual effects.

The motion line generator 240 may generate the motion effect geometry 265 in any technically feasible fashion. For example, and without limitation, the motion line generator 240 could compute the trajectory of the selected component 226 based on sampling the location of the selected component 226 at discrete time steps within the time interval 224. In another example, in some embodiments, and without limitation, the 3D animated model interactive tool 110 may be included in Maya® software, commercially available from Autodesk, Inc. In such embodiments, if the style parameter is "turbulent," then the motion line generator 240 may attach a directional Maya® "particle system" with a point emitter to generate the motion line and may then attach a turbulence field to the particle system to create the desired deformation or irregularities.

If the motion depiction technique 222 is "particle/fluid system," then the particle/fluid system generator 250 processes the user input and generates motion effect geometries 265 that represent smoke and fluid effects. If the motion depiction technique 222 is "sweep," then the sweep generator 260 processes the user input and generates motion effect geometries 265 that portray the motion of a two-dimensional (2D) curve or edge over the time interval 226. An analogous effect in 2D pictures is a long exposure photographic blur. Notably, the sweep generator 260 configures the motion sculpture UI 230 to facilitate the selection of a 2D curve or edge on the surface of the 3D animated model 215 as the selected component 226.

If the motion depiction technique 222 is "multiple stroboscopic stamps," then the multiple stroboscopic stamps generator 270 generates a series of discrete, static, slightly different 3D stamps (i.e., snapshots) of the animated 3D model 215 or the selected component 222 taken at different times within the time interval 224. Subsequently, the stroboscopic stamps generator 270 overlaps the 3D stamps to create the single motion effect geometry 265. Because the multiple stroboscopic stamps effectively portray the impression of motion without sacrificing clarity of resolution of the 3D animated model 215, this technique facilitates comparison and analysis of a structure that is deforming over time, such as a flying bird.

Based on input received via the motion sculpture UI 230, the motion effect generator 120 may apply any number of motion depiction techniques 222 to any selected components 226 included in of the 3D animated model 215 in any combination and in any order. In some embodiments, the user may interactively modify the motion effect geometries 265 via a user interface included in the 3D animated model interactive tool 110.

After the user generates the desired motion effect geometries 265, the motion sculpture model exporter 280 creates the 3D motion sculpture model 285 based on the motion effect geometries 265 and/or the 3D animated model 215. For example, and without limitation, the motion line generator 240 may configure the motion sculpture model exporter 280 to include a snapshot of the 3D animated model 215 at the end of the interval 224 in addition to the motion effect geometries 265. By contrast, and without limitation, the multiple stroboscopic stamps generator 270 may be configured to capture only the motion of the selected component 226, not the entire 3D animated model 215. Consequently, the corresponding motion effect geometry 265 may not include the entire 3D animated model 215.

In particular, the motion sculpture model exporter 280 may perform one or more conversion operations to transform the motion effect geometries 265 into a format that is amenable to 3D printing In some embodiments, without limitation, as part of this conversion process, the motion sculpture model exporter 280 may ensure that the 3D motion sculpture model 285 is suitable for fabrication using the 3D printer 290. For example, in some embodiments, if the motion effect geometries 264 include a trail of poorly-supported "bubbles" that represent a particle system, then the motion sculpture model exporter 280 may add material to the bubbles to accommodate a bottom-up fabrication process implemented by the 3D printer 290. In other embodiments and without limitation, as part of creating the 3D motion sculpture model, the motion sculpture model exporter 280 may enforce minimum geometry thickness fabrication constraints.

The 3D motion sculpture model 285 may conform to any 3D printable format as known in the art. For instance, in some embodiments the 3D motion sculpture model 285 may capture unit normal and vertices that define a 3D solid object that includes the motion effect geometries 265 in the stereolithograpy format. In alternate embodiments, the 3D motion sculpture model 285 may capture a 3D mesh of interconnected triangles that define a 3D solid object that includes the motion effect geometries 265 in the collaborative design activity (COLLADA) format.

The 3D printer 290 is any device capable of additively printing a 3D object, shown as the motion sculpture 295, based on the 3D motion sculpture model 285. The 3D printer 290 may be configured to build-up any type of 3D object in any technically feasible fashion. For instance, in some embodiments, the 3D printer 290 extrudes plastic, and the 3D printer 290 may be configured to print a plastic sculpture depicting the movement of a bird over time based on a specified motion sculpture model 285 that includes multiple stroboscopic stamp geometries. As part of generating the motion sculpture model 285, the 3D animated model interactive tool 110, the motion effect generator 120, and/or the 3D printer 290 may be configured to generate support geometry that ensures that each successive layer of the motion sculpture model 285 receives the support required to prevent gravity-induced defects, thereby ensuring the integrity of the motion sculpture 295 throughout the 3D printing process. For example, in some embodiments, without limitation, the motion effect generator 120 may perform one or more optimization operations that modify any number of the motion effect geometries 265 to include any number of structures that physically support the motion sculpture 295.

After the 3D printer 290 generates the top layer of the motion sculpture 295, a portion or all of the support geometry may be unnecessary and may detract from the aesthetic appeal and/or functionality of the motion sculpture 295. Accordingly, a 3D support remover may perform removal operations that separate the extraneous support material from the motion sculpture 295, thereby revealing the motion sculpture 295 specified by the 3D motion sculpture model 285, unencumbered by the constraints of the manufacturing process. In some embodiments, the 3D support remover is a human who manually cuts away or peels off the support material. In other embodiments, the 3D support material is water soluble, and the 3D support remover is a bath of water.

It will be appreciated that the system shown herein is illustrative and that variations and modifications are possible. The connection topology, including the number and arrangement of the 3D animated model interactive tool 110, the motion effect generator 120, and the 3D printer 290, may be modified as desired. In certain embodiments, one or more selected components shown in FIGS. 1 and 2 may not be present. For instance and without limitation, the 3D animated model interactive tool 100 could be eliminated, and the motion effect generator 1200 could receive a manually created 3D animated model 215 as input. Lastly, the 3D animated model interactive tool 110 and the motion effect generator 120 may be implemented in any combination of software and hardware units.

Figure 3:
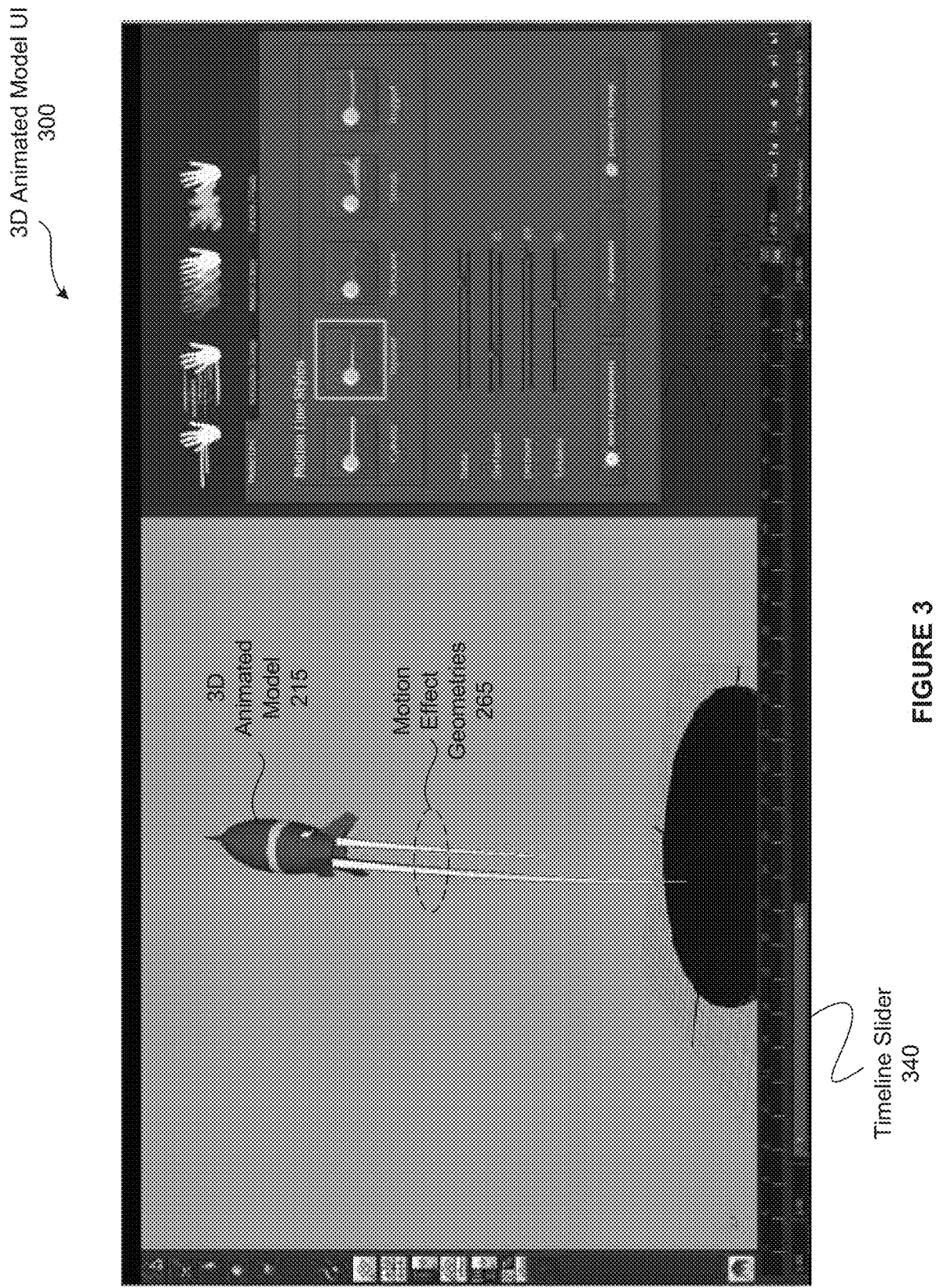
FIG. 3 is a conceptual illustration of the motion sculpture user interface of FIG. 2, according to one embodiment of the present invention.

FIG. 3 is a conceptual illustration of the motion sculpture user interface (UI) 230 of FIG. 2, according to one embodiment of the present invention. The context of FIG. 3 is that the user configures the motion effect generator 120 to create the motion effect geometries 265 via a 3D animated model UI 300 that is included in the 3D animated model interactive tool 110.

As shown, the 3D animated model UI 300 includes the motion sculpture UI 230 and a timeline slider 340. The motion sculpture UI 230 is displaying a "motion line style" pane that corresponds to the motion depiction technique 222 of "motion line." The motion sculpture UI 230 includes sliders to set the values of the motion effect parameters 228, such as the radius of the motion line. The motion sculpture UI 230 also includes control mechanisms that enable the user to perform various design flow tasks, such as and without limitation, "select components" (identify the selected component 222), "generate" (create the motion effect geometries 265), and "convert to mesh" (generate the 3D motion sculpture model 285).

Because the "tapered" motion line style is selected, the motion effect geometries 265 include tapered motion lines that reflect the time interval 224 specified by the timeline slider 340. The user may interactively alter the motion effect geometries 265 by modifying the setting of the timeline slider 340, the motion line style, and the values of any number of the motion effect parameters 228.

Figure 4:
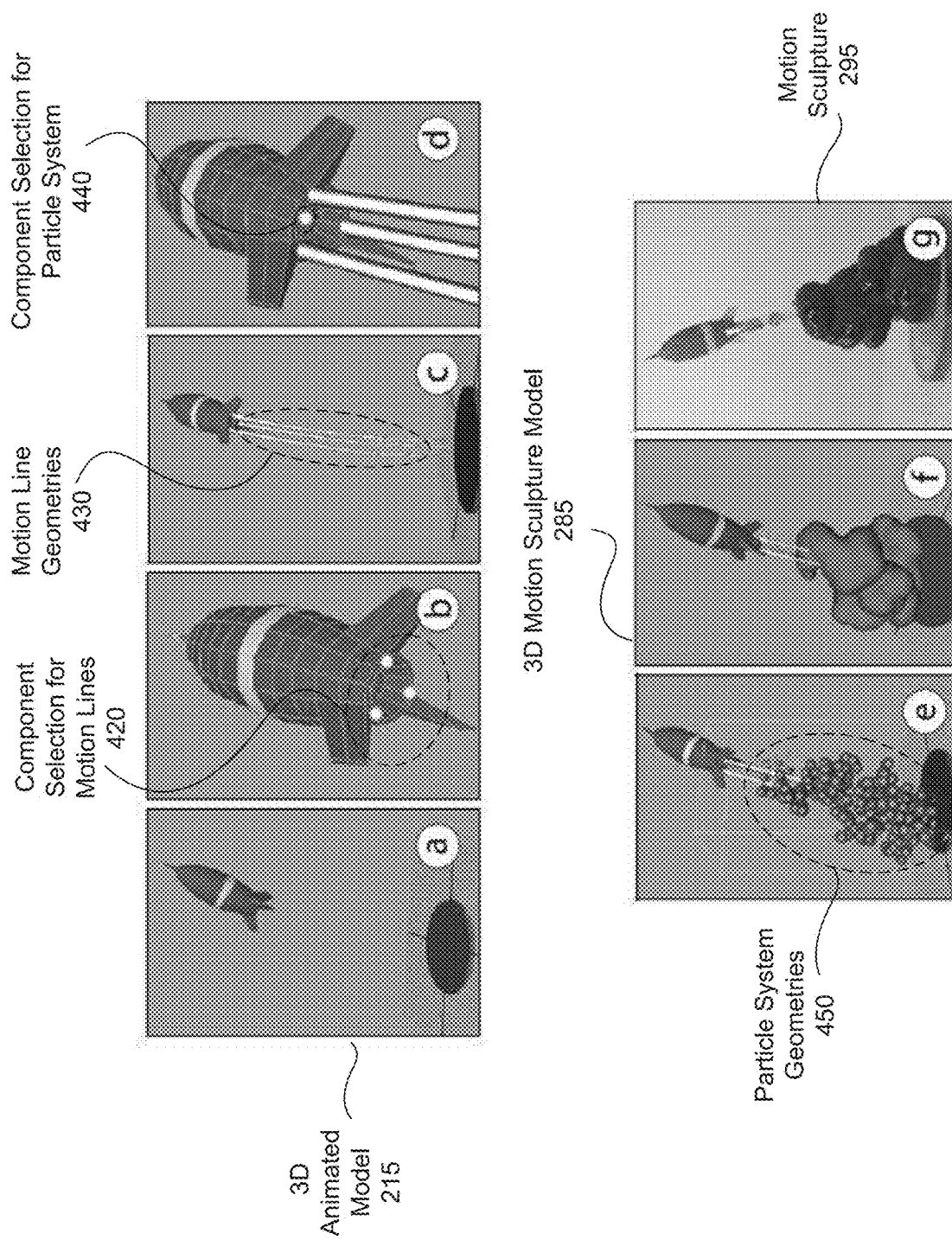
FIG. 4 is a conceptual diagram illustrating how the motion effect generator of FIG. 2 may be configured to create motion line geometries and particle system geometries, according to one embodiment of the present invention.

FIG. 4 is a conceptual diagram illustrating how the motion effect generator 120 of FIG. 2 may be configured to create motion line geometries 430 and particle system geometries 450, according to one embodiment of the present invention. FIG. 4 depicts the design flow of the motion sculpture 295 as a series of sequential snapshots, labeled "a" through "g."

Snapshot "a" depicts the 3D animated model 215—a rocket. Snapshot "b" illustrates a component selection for motion lines 420. More specifically, as shown, the selected component 226 includes three separate vertices along the bottom surface of the 3D animated model 215 (the base of the rocket). Snapshot "c" shows motion line geometries 430 and emanating from the selected component 226. The motion line geometries 430 a are the motion effect geometries 255 created by the motion line generator 240.

Snapshot "d" illustrates a component selection for particle system 440. The selected component 226 includes a single vertex along the bottom surface of the 3D animated model 215. Snapshot "e" illustrates particle system geometries 450 that are the motion line geometries 430 created by the particle/fluid system generator 250. Notably, the particle system geometries 450 include multiple bubbles that do not conform to the fabrication constraints of the 3D printer 290. Consequently, as part of generating the 3D motion sculpture model 285 (snapshot "f"), the motion sculpture model exporter 280 adds material to the particle system geometries 450 to enable fabrication of the 3D motion sculpture model 285 using the 3D printer 290. Lastly, snapshot "g" shows the motion sculpture 295 after the 3D motion sculpture model 285 is fabricated using the 3D printer 290.

Figure 5:
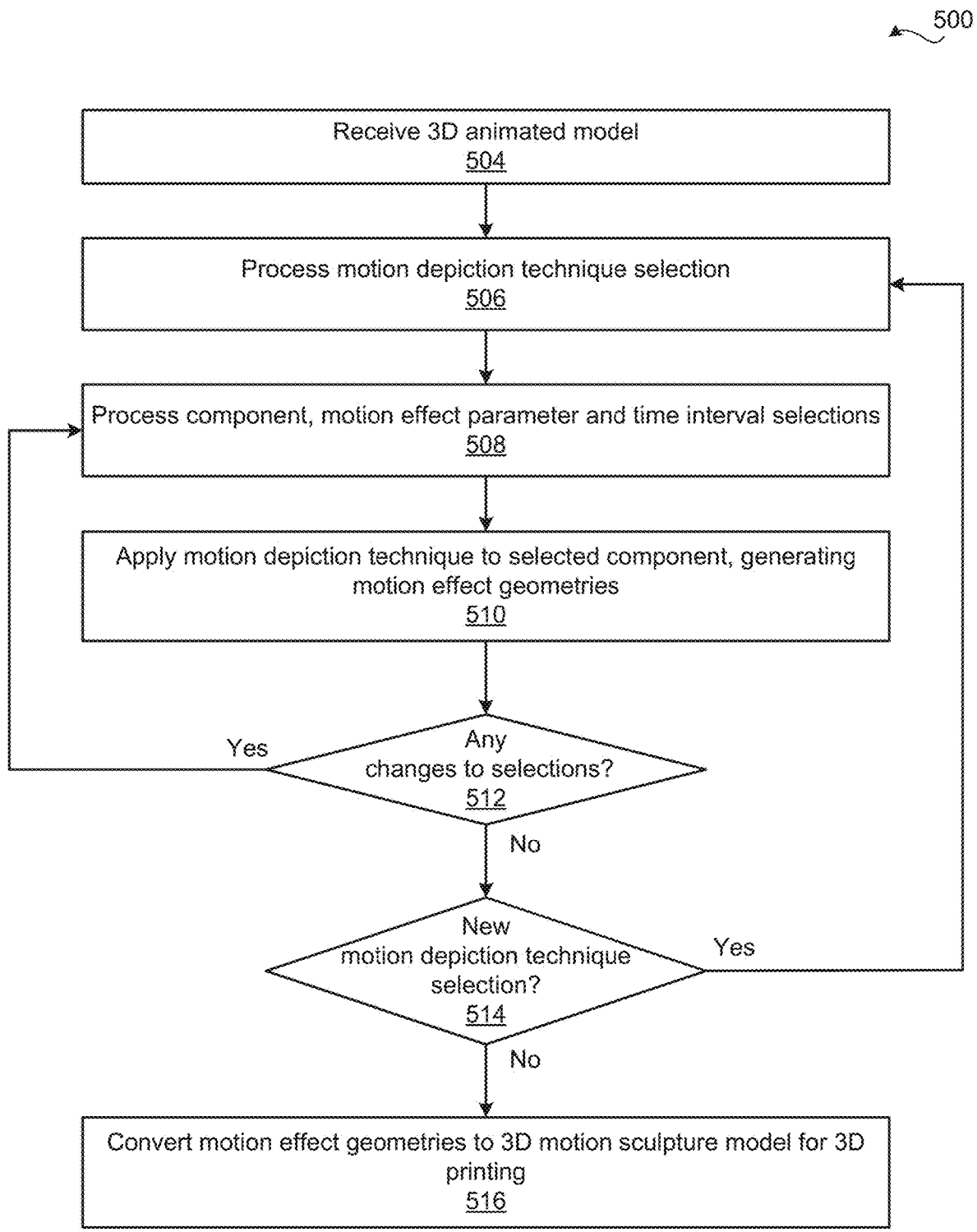
FIG. 5 is a flow diagram of method steps for generating a 3D model of a motion sculpture for 3D printing, according to one embodiment of the present invention.

FIG. 5 is a flow diagram of method steps for generating a 3D model of a motion sculpture for 3D printing, according to one embodiment of the present invention. Although the method steps are described with reference to the systems of FIGS. 1-4, persons skilled in the art will understand that any system configured to implement the method steps, in any order, falls within the scope of the present invention.

As shown, a method 500 begins at step 504, where the motion effect generator 120 receives the 3D animated model 215 from the 3D animated model interactive tool 110 and, in response, causes the display device 114 to display the motion sculpture UI 230. At step 506, the motion sculpture UI 230 receives and processes a user-based selection of the motion depiction technique 222. The motion sculpture UI 230 may receive the selection in any technically feasible fashion, such as via a UI widget included in the motion sculpture UI 230. As part of step 506 and based on the motion depiction technique 222, the motion effect generator 120 selects one of the motion line generator 240, the particle/fluid system generator 250, the sweep generator 260, and the multiple stroboscopic stamps generator 270 as a selected motion depiction generator.

In some embodiments, the selected motion depiction generator configures the motion sculpture UI 230 to reflect the motion depiction technique 222. For example, and without limitation, if the motion depiction technique 222 is "motion line," then the motion line generator 240 could cause the motion sculpture UI 230 to display a motion line panel that could include a UI widget to enable selection of the motion effect parameters 228 "motion line style." Further, the motion line generator 240 could configure a "component selection" UI widget to enable selection of one or more vertices. In general, by providing such customized UI specialization, the motion effect generator 120 can prompt the user to enter relevant information via intuitive, user-friendly, entry mechanisms (e.g., UI widgets), thereby optimizing the overall design experience.

At step 508, the selected motion depiction generator receives and processes configuration data for the selected component 226, the motion effect parameters 228, and the time interval 224. As used herein, the "selected motion depiction generator" refers to the motion effect generator 120 configured according to the selected motion depiction technique 222. In operation, the configured motion effect generator 120 implements, among other things, the functionality included in one of, without limitation, the motion line generator 240, the particle/fluid system generator 250, the sweep generator 260, or the multiple stroboscopic stamps generator 270.

The selected motion depiction generator may receive the configuration data and then process the configuration data to determine the selected components 226, the motion effect parameters 228, and the time interval 225 in any technically feasible fashion. For example, in some embodiments, the selected motion depiction generator may receive the configuration data via the motion sculpture UI 230. In such embodiments, the configuration data may directly specify (i.e., relay values for) the selected components 226, the motion effect parameters 228, and the time interval 225. As part of step 508, the selected motion depiction generator customizes the motion depiction technique 222 based on the selected component 226, the motion effect parameters 228, and the time interval 224.

At step 510, the selected motion depiction generator applies the motion depiction technique 222 to the selected component 226, generating the motion effect geometries 265 based on values of the motion effect parameters 228 and the location of the selected component 226 as the selected component 226 animates through the time interval 224. At step 512, the motion sculpture UI 230 determines whether the motion sculpture UI 230 has received configuration data that modifies the selected component 226, the motion effect parameters 228, and/or the time interval 224. As used herein, "configuration data" refers to any amount of data that is received either directly or indirectly that guides the creation of the 3D motion sculpture model 285. In some embodiments, the configuration data may include data dynamically received from the user via one or more user interfaces, such as the motion sculpture user interface 230. In other embodiments, the configuration data may include information that is defined in a static, off-line, batch mode to guide the creation of multiple 3D motion sculpture models 285.

If, at step 512, the motion sculpture UI 230 detects changes to configuration settings, then the method 500 returns to step 508, where the selected motion depiction generator processes the relevant configuration changes—re-customizing the motion depiction technique 222. Relevant configuration settings include, without limitation, the selected component 226, the motion effect parameters 228, and the time interval 224. The motion effect generator 120 continues to cycle through steps 508-512, updating the motion effect geometries 265 to reflect the relevant configuration changes, until the motion sculpture UI 230 determines that the selected component 226, the motion effect parameters 228, and the time interval 224 are unchanged.

If at step 512, the motion sculpture UI 230 determines that the selected component 226, the motion effect parameters 228, and the time interval 224 are unchanged, then the method 500 proceeds directly to step 514. At step 514, the motion sculpture UI 230 determines whether the motion sculpture UI 230 has received user input that specifies another motion depiction technique 222. At step 514, if the motion sculpture UI 230 determines that the user input specifies another motion depiction technique 222, then the method 500 returns to step 506, previously described herein. The motion effect generator 120 continues to cycle through steps 506-514, generating the motion effect geometries 265 based on user input until the motion sculpture UI 230 determines that the selected component 226, the motion effect parameters 228, the time interval 224 and the motion depiction technique 222 are unchanged.

In general, changes to the selected component 226, the motion effect parameters 228, the time interval 224 and the motion depiction technique 222 may be initiated by the user via any number and type of mechanisms (e.g., UI widgets, panels, tabs, etc.) included in any interface, such as the motion sculpture UI 230. Advantageously, because the motion effect generator 120 dynamically updates the motion effect geometries 265 to reflect such changes, the motion effect generator 120 supports efficient, user-friendly, interactive design approaches. Notably, by facilitating interactive design approaches, the motion effect generator 120 may dramatically reduce the time required to produce the 3D motion sculpture model 285 compared to conventional, primarily manual approaches to motion sculpture model design that are not conducive to interactive and/or repetitive processes.

If, at step 514, the motion depiction technique 222 is unchanged, then the method 500 proceeds to step 516. At step 516, the motion sculpture model exporter 280 generates the 3D motion sculpture model 285 based on the motion effect geometries 265. In some embodiments, the motion sculpture model exporter 280 may ensure that the 3D motion sculpture model 285 is amenable to 3D printing using the 3D printer 270.

In sum, the disclosed techniques may be used to automate portions of the motion sculpture design process. In particular, a motion effect generator creates static motion effect geometries that convey a visual impression of the motion of a 3D animated model. In operation, the motion effect generator receives a 3D animated model and implements a user interface that enables the user to interactively select and configure motion depiction techniques. The motion depiction techniques include, without limitation, motion lines, particle systems, fluid systems, sweeps, and multiple stroboscopic stamps. The motion effect generator then animates the 3D animated model, applying the selected motion depiction technique to one or more selected components included in the 3D animated model through a selected time interval to generate motion effect geometries.

The motion effect generator may apply any number of motion depiction techniques in any order to the 3D animated model based on input received via the user interface. After the motion effect generator generates the desired motion effect geometries, a motion sculpture exporter converts the motion effect geometries to a motion sculpture model, such as a polygon mesh. When manufactured using a 3D printer, the polygon mesh produces a static 3D motion sculpture.

Advantageously, automating the motion sculpture design flow significantly reduces the time required to create high quality motion sculptures compared to conventional, primarily manual techniques. The motion effect sculpture generator not only assuages the burden of tedious design tasks, but also enables real-time interactive design optimization, such as interactively exploring whether to portray exhaust from a rocket using turbulent motion lines or particle systems. Further, in contrast to conventional techniques that typically rely heavily on the expertise of users, the motion effect sculpture generator implements algorithms that incorporate sculpting and fabrication knowledge. Consequently, the motion effect sculpture generator enables relatively unskilled users to create effective motion sculpture models.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention has been described above with reference to specific embodiments. Persons of ordinary skill in the art, however, will understand that various modifications and changes may be made thereto without departing from the broader spirit and scope of the invention as set forth in the appended claims. For example, and without limitation, although many of the descriptions herein refer to specific types of audiovisual equipment and sensors, persons skilled in the art will appreciate that the systems and techniques described herein are applicable to other types of performance output devices (e.g., lasers, fog machines, etc.) and sensors. The foregoing description and drawings are, accordingly, to be regarded in an illustrative rather than a restrictive sense.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating a three-dimensional (3D) model of a motion sculpture for 3D printing, the method comprising:
   receiving a 3D animated model representing an object;
   receiving, via a user interface, one or more user inputs selecting a first motion depiction technique, a time interval, and a component included within the 3D animated model;
   determining a respective location of the selected component at each of one or more points in time within the time interval;
   generating a 3D motion effect geometry by applying the first motion depiction technique to the selected component based on the respective location of the selected component at each of the one or more points in time; and
   converting the 3D motion effect geometry into at least a portion of a 3D digital model configured for 3D printing.

2. The method of claim 1, wherein applying the first motion depiction technique comprises producing a geometric shape that represents a motion line, a sweep, a multiple stroboscopic stamp, a particle system, or a fluid system.

3. The method of claim 1, wherein converting the 3D motion effect geometry comprises generating a polygon mesh based on the 3D motion effect geometry.

4. The method of claim 1, wherein the first motion depiction technique is included in a plurality of motion depiction techniques, and further comprising receiving a first parameter via the user interface, and applying the first motion depiction technique based on the first parameter.

5. The method of claim 4, further comprising receiving a second parameter via the user interface, and configuring the first motion depiction technique based on the second parameter.

6. The method of claim 5, further comprising receiving a third parameter via the user interface, and adjusting the 3D motion effect geometry to reflect the third parameter.

7. The method of claim 1, further comprising identifying the selected component based on a component type associated with the first motion depiction technique.

8. The method of claim 1, wherein the selected component comprises at least one of a vertex, an edge, a two dimensional curve, and an object.

9. One or more non-transitory computer-readable storage media including instructions that, when executed by one or more processing units, cause the one or more processing units to generate a three-dimensional (3D) model of a motion sculpture for 3D printing by performing the steps of:
   receiving a 3D animated model representing an object;
   receiving, via a user interface, one or more user inputs selecting a first motion depiction technique, a time interval, and a component included within the 3D animated model;
   determining a respective location of the selected component at each of one or more points in time within the time interval;
   generating a 3D motion effect geometry within the 3D animated model by applying the first motion depiction technique to the selected component based on the respective location of the selected component at each of the one or more points in time; and
   converting the 3D motion effect geometry into at least a portion of a 3D digital model configured for 3D printing.

10. The one or more non-transitory computer-readable storage media of claim 9, wherein applying the first motion depiction technique comprises producing a geometric shape that represents a motion line, a sweep, a multiple stroboscopic stamp, a particle system, or a fluid system.

11. The one or more non-transitory computer-readable storage media of claim 9, wherein converting the 3D motion effect geometry comprises automatically adding one or more geometric shapes that are configured to physically support at least the portion of the 3D digital model corresponding to the 3D motion effect geometry during 3D printing.

12. The one or more non-transitory computer-readable storage media of claim 9, wherein generating the 3D motion effect geometry comprises determining a length of a physical dimension based on the received time interval, and generating one or more geometric shapes that span the length of the physical dimension.

13. The one or more non-transitory computer-readable storage media of claim 9, wherein converting the 3D motion effect geometry comprises generating a polygon mesh based on the 3D motion effect geometry.

14. The one or more non-transitory computer-readable storage media of claim 9, wherein the steps further comprise identifying the selected component based on a component type associated with the first motion depiction technique.

15. The one or more non-transitory computer-readable storage media of claim 9, wherein the selected component comprises at least one of a vertex, an edge, a two dimensional curve, and an object.

16. The one or more non-transitory computer-readable storage media of claim 9, wherein the steps further comprise displaying an enhanced image of the 3D animated model, wherein the enhanced image includes the 3D motion effect geometry.

17. A system configured to generate a three-dimensional (3D) model of a motion sculpture for 3D printing, the system comprising:
   a processing unit configured to:
      receive a 3D animated model representing an object,
      receive, via a user interface, one or more user inputs selecting a first motion depiction technique, a time interval, and a component included within the 3D animated model,
      determine a respective location of the selected component at each of one or more points in time within the time interval,
      generate a 3D motion effect geometry within the 3D animated model by applying the first motion depiction technique to the selected component based on the respective location of the selected component at each of the one or more points in time, and
      convert the 3D motion effect geometry into at least a portion of a 3D digital model configured for 3D printing; and
   a display device coupled to the processing unit and configured to display an enhanced image of the 3D animated model, wherein the enhanced image includes the 3D motion effect geometry.

18. The system of claim 17, wherein applying the first motion depiction technique comprises producing a geometric shape that represents a motion line, a sweep, a multiple stroboscopic stamp, a particle system, or a fluid system.

19. The system of claim 17, wherein converting the 3D motion effect geometry comprises generating a polygon mesh based on the 3D motion effect geometry.

20. The system of claim 17, wherein the selected component comprises at least one of a vertex, an edge, a two dimensional curve, and an object.

* * * * *

UNITED STATES PATENT AND TRADEMARK OFFICE
CERTIFICATE OF CORRECTION

PATENT NO. : 10,620,610 B2
APPLICATION NO. : 14/811746
DATED : April 14, 2020
INVENTOR(S) : Tovi Grossman et al.

It is certified that error appears in the above-identified patent and that said Letters Patent is hereby corrected as shown below:

In the Claims

Column 13, Claim 1, Line 47, please delete "selected";

Column 13, Claim 1, Line 51, please delete "selected";

Column 13, Claim 1, Line 52, please delete "selected";

Column 14, Claim 7, Line 11, please delete "selected";

Column 14, Claim 8, Line 13, please delete "selected";

Column 14, Claim 9, Line 26, please delete "selected";

Column 14, Claim 9, Line 31, please delete "selected";

Column 14, Claim 9, Line 32, please delete "selected";

Column 14, Claim 14, Line 60, please delete "selected";

Column 14, Claim 15, Line 63, please delete "selected";

Column 15, Claim 17, Line 13, please delete "selected";

Column 15, Claim 17, Line 18, please delete "selected";

Column 15, Claim 17, Line 19, please delete "selected";

Column 16, Claim 20, Line 15, please delete "selected".

Signed and Sealed this
Twenty-sixth Day of May, 2020

Andrei Iancu
*Director of the United States Patent and Trademark Office*